United States Patent [19]

Miller

[11] 4,257,702
[45] Mar. 24, 1981

[54] APPARATUS FOR ASCERTAINING COLOR BALANCE OF PHOTOGRAPHIC PRINTING PAPER

[76] Inventor: Bertram W. Miller, Apartado Postal 316, Chapala, Jalisco, Mexico

[21] Appl. No.: 12,665

[22] Filed: Feb. 16, 1979

Related U.S. Application Data

[62] Division of Ser. No. 812,808, Jul. 5, 1977, Pat. No. 4,166,701.

[51] Int. Cl.³ ............................................. G03B 27/72
[52] U.S. Cl. ....................................... 355/71; 355/32; 355/72
[58] Field of Search ....................... 355/32, 35, 72, 71, 355/74, 77, 88

[56] References Cited
U.S. PATENT DOCUMENTS

| | | | |
|---|---|---|---|
| 2,441,919 | 5/1948 | Lockrey et al. | 355/71 X |
| 3,737,224 | 6/1973 | Culler | 355/32 |
| 3,748,045 | 7/1973 | Mitchell | 355/32 X |
| 3,901,598 | 8/1975 | Vanheerentals | 355/77 X |

*Primary Examiner*—Richard A. Wintercorn

*Attorney, Agent, or Firm*—Hubbard, Thurman, Turner, Tucker & Glaser

[57] ABSTRACT

The color balance of color photographic printing paper is determined by making three successive exposures of separate portions of a sample sheet of printing paper through a neutral-color optical wedge of linear density gradient, each exposure consisting essentially of a different primary color of light of predetermined intensity and duration to selectively stimulate each of the three color-sensitive emulsion layers in the printing paper. The three images produced upon development provide a means for objective quantitative measurement of the relative responsiveness of each of the emulsion layers using a reflection densitometer to locate points of equal optical density, the relative linear displacement of the points providing color-balance correction factors. An easel is provided with a sliding carriage for positioning the sample sheet of printing paper in proper relationship to the optical wedge, which is fixed in place in an aperture in a light-proof cover. A device for calculating the correction factors from the printed images of the optical wedge is equipped with sliding scale members calibrated for measuring displacement in appropriate units for making color-balance corrections.

4 Claims, 6 Drawing Figures

APPARATUS FOR ASCERTAINING COLOR BALANCE OF PHOTOGRAPHIC PRINTING PAPER

BACKGROUND OF THE INVENTION

This is a division of application Ser. No. 812,808, filed July 5, 1977, now U.S. Pat. No. 4,166,701.

The present invention pertains to color balancing of photographic printing paper.

Although the present invention has application in various photographic processes, it is particularly useful with processes wherein a positive print is produced from a color negative using materials known as integral tripacks which have three superimposed light-sensitive emulsion layers. Those skilled in the art will appreciate that it is rarely if ever possible to produce a print with accurate color rendition without adjusting for color-balance variations, which are caused by color-mix changes in lighting conditions and changes in the characteristics of films and printing papers. Negative-positive processes provide substantial latitude in making color correction in printing the negative by selective variation of red, green, and blue light exposures. There are two principal techniques for making such exposure variations in present use. In tricolor additive printing, three separate exposures of the negative to the printing paper are made respectively through red, green, and blue separation filters, wherein the three exposure times are varied to control color correction. Exposure of the printing paper to varying amounts of red, green, and blue light, hereinafter referred to as the primary colors of light, is thereby achieved. In white-light subtractive printing, a single exposure of the negative to the printing paper is made through a combination of colored filters, wherein filter densities and colors are varied to control color correction, thereby selectively filtering out varying amounts of the primary colors of light. In either case, color control is achieved by selectively varying the exposures of the primary colors of light to the printing paper, exposure being basically a product of light intensity and duration. Such colored light variations produce corresponding variations in the production of complementary colored dyes by the three emulsion layers, red light producing cyan dye, green light producing magenta dye, and blue light producing yellow dye.

Most prior art color balancing techniques employ visual color judgments using test prints. Of particular application to the white-light subtractive printing technique is the use of color filters for viewing a test print to make a judgment as to filtering changes for making subsequent prints. Less subjective techniques involve the use of electronic color analyzers to detect changes in color balance from negative to negative. Proper use of such color analyzers requires information as to the color balance of the printing paper being used. Due to changes in storage conditions and age, no two boxes of color printing paper have precisely the same color balance. Therefore, upon starting a new box of printing paper, a test print is made to obtain the necessary color balance information, which can then be used to reprogram the color analyzer. Here again even the most sophisticated prior art techniques resort to subjective visual judgment in obtaining such color balance information about the new printing paper to be used. In one popular technique, a picture is first taken of a gray card, whereupon the gray card negative is printed through a matrix of colored filters onto a sample sheet of the printing paper under test. By visual comparison, a gray patch is then found on the print, enabling the selection of an appropriate filter combination for color balancing the system. The color analyzer can then be programmed to such a filter combination to compensate for the characteristics of the printing paper. Different color negatives can then be tested for color balance by the color analyzer, enabling exposure corrections to be made regardless of whether tricolor additive or white-light subtractive printing is then used.

Subjective visual judgment is eliminated in one prior art technique of ascertaining the color balance of photographic printing paper in accordance with U.S. Pat. No. 3,392,626. While the procedure is effective, it is also laborious and time consuming. It requires measuring reflection densities corresponding to discrete values of step wedge density for each of three color exposures, then plotting graphs from the density measurements, and finally making numerical calculations from the graphs to provide color balance data.

The present invention provides a greatly simplified objective instrumental technique for obtaining the color balance of photographic printing paper without reliance on subjective visual judgment and without the laborious graphing techniques described in the cited patent.

SUMMARY OF THE INVENTION

In accordance with the present invention, the color balance of color photographic printing paper of the type having superimposed emulsion layers is ascertained by forming separate test images on a sample sheet of printing paper, each image being representative of the responsiveness of one of the emulsion layers, each image being formed using a predetermined linearly varying exposure, such that changes in optical density can be measured in terms of changes in displacement, thereby providing objective correction for color balance. A specially constructed easel provided with an optical wedge facilitates exposures of printing paper under darkroom conditions for forming the test images. A specially constructed calculator facilitates measurement of differential displacement on the test images and determination of quantitative correction factors.

The novel features believed characteristic of the invention are set forth in the appended claims. The nature of the invention, however, as well as its essential features and advantages, may be understood more fully upon consideration of illustrative embodiments when read in conjunction with the accompanying drawings wherein:

DESCRIPTION OF THE PREFERRED EMBODIMENTS

Figure 1:
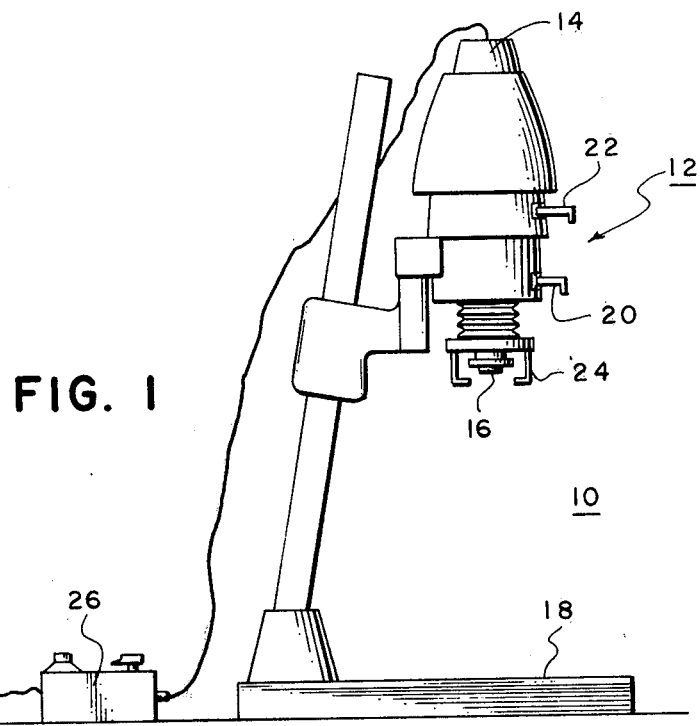
FIG. 1 is a vertical elevation of a photographic enlarger for use with the present invention.
Figure 2:
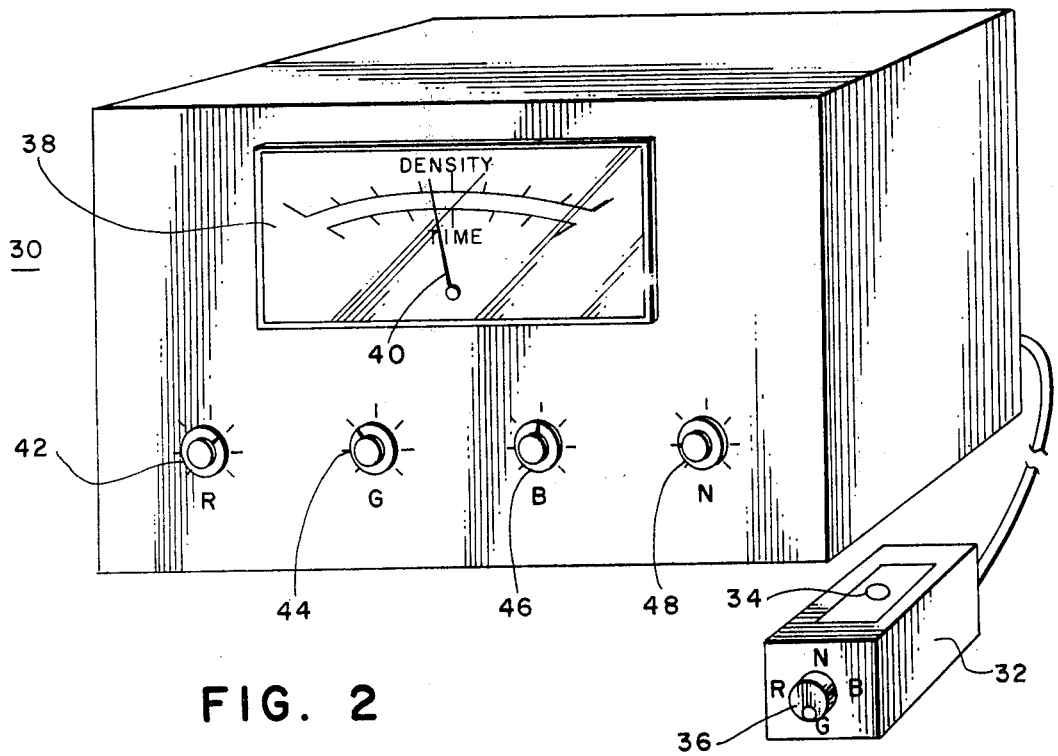
FIG. 2 is a view in perspective of a color analyzer for use with the present invention.
Figure 3:
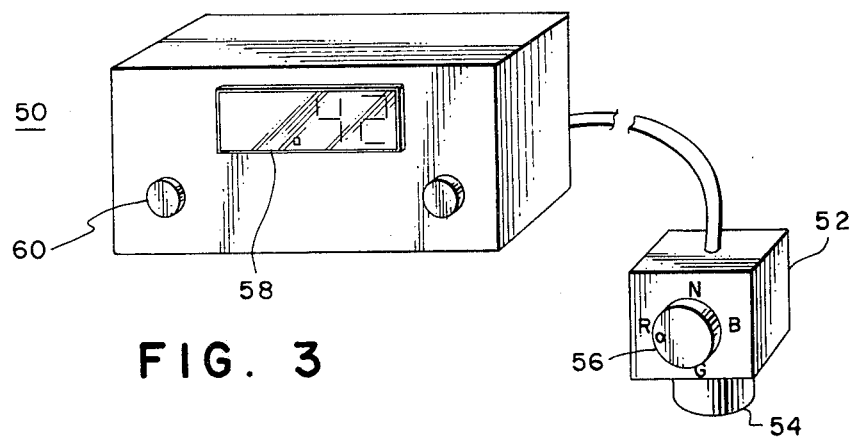
FIG. 3 is a view in perspective of a densitometer for use with the present invention.

FIGS. 1, 2 and 3 illustrate known pieces of equipment, which may be used in practicing the present invention.

FIG. 1 illustrates a general purpose photographic enlarger 10 having a head 12 which is equipped with a lamp 14 for producing light through a lense 16 at selected heights above a baseboard 18. A negative carrier 20 is disposed in the lamp 12 between the lamp 14 and the lense 16. The head is provided with a drawer 22 for inserting filters in the light path above the negative. In addition, a holder 24 is provided for inserting filters beneath the lense 16. The voltage of the lamp 14 is preferably controlled by a device 26, the significance of which is discussed below.

FIG. 2 illustrates a color analyzer 30, also known as an easel-reading transmission-type densitometer, a variety of which are presently marketed. The color analyzer 30 is equipped with a probe 32 having an aperture 34 through which the light to be analyzed passes. The color of the light to be analyzed, whether red, green, blue or neutral, is selected by means of a color-channel control knob 36. A meter 38 having a needle 40 and density and time scales is provided for controlling light intensity and exposure time as described below. The color analyzer 30 is provided with four attenuator controls 42, 44, 46, and 48, one for each of the four color channels, which may be used to give quantitative readings of optical density as determined by their settings.

FIG. 3 illustrates a reflection-type densitometer 50, which is capable of measuring the optical density of a color photographic print. The densitometer comprises a probe 52 having a lens 54 through which test light emerges and reflected light returns. The color of the emerging test light, whether red, green, blue, or neutral, is selected by means of a color-channel control knob 56. Reflected light is sensed and displayed in units of optical density by a readout 58. A control 60 is provided for adjusting readings to zero optical density.

Figure 4:
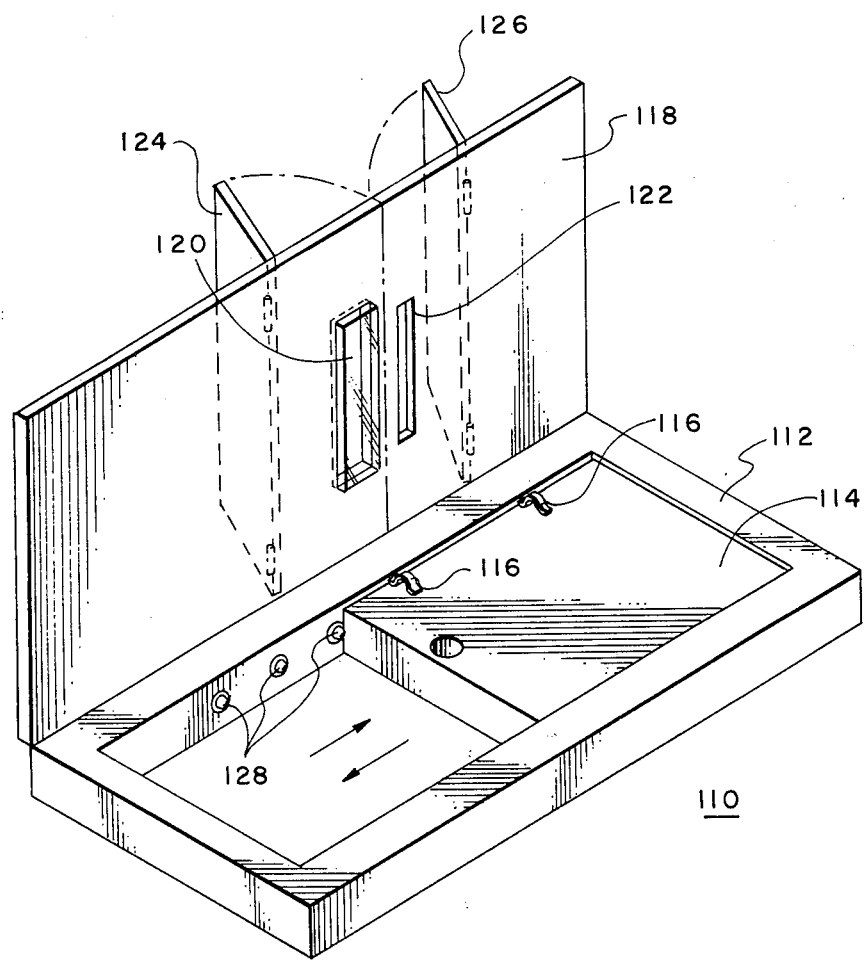
FIG. 4 is a view in perspective of an easel constructed in accordance with the present invention.

FIG. 4 illustrates a specially equipped easel, generally indicated by reference numeral 110, for preparing a specimen of color printing paper for analysis. The easel 110 has a frame 112 with a carriage 114 slideably disposed therein in the manner depicted. Clips 116 are provided for securing printing paper to the carriage 114. A light-proof cover 118 is hinged to one edge of the frame 112. Fitted into the cover 118 is a color-neutral optical wedge 120 of linear density gradient. Of the available wedges, it is preferred that the wedge 120 be a precision type which varies continuously in opacity by ±0.50 optical density units from its midpoint. Also in the cover 118 is an aperture 122 conveniently spaced from the optical wedge 120. Hinged flaps 124 and 126 are mounted on the cover 118 for selectively covering respectively the optical wedge 120 and/or the aperture 122 in the depicted manner. The frame 112 of the easel 110 is equipped with means for selectively positioning the carriage 114 in at least three different positions for making separate successive exposures of a color print through the wedge 120. The positioning means, which are provided to facilitate proper spatial arrangement of the carriage 114 by the user in complete darkness, may take the form of mechanical stops 128 providing a resistance to movement that can be felt as the carriage 114 slides in the frame 112 as indicated by the arrows. The stops 128 may, for example, comprise spring-loaded ball bearings which protrude from the frame 112 as shown to interfere slightly with the leading edge of the carriage 114 as it slideably engages the inside walls of the frame 112. Alternatively, a set of marks (not shown) can be placed at appropriate points on a surface of the frame 112, so that they can be felt by the fingertips for proper positioning of the carriage 114 in the dark.

Figure 5:
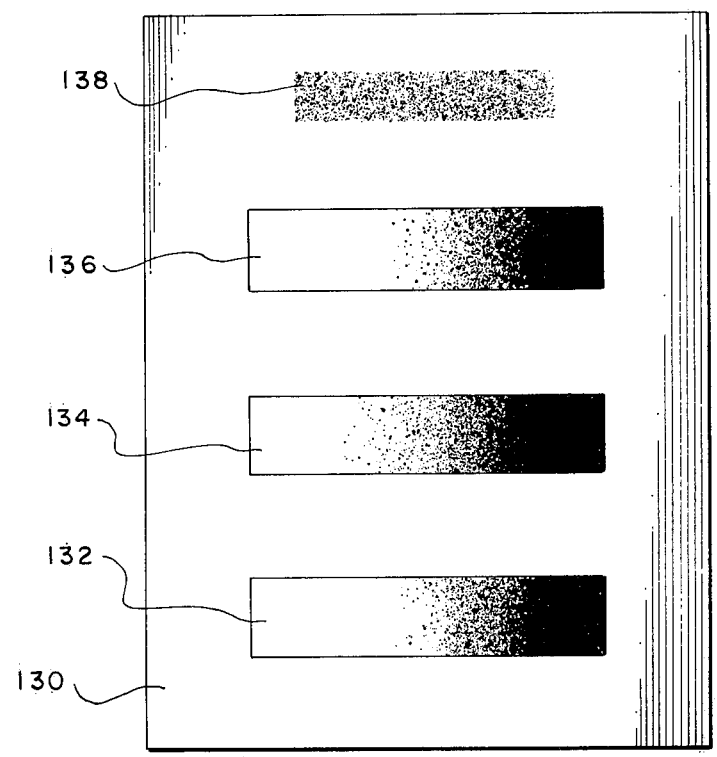
FIG. 5 is a plan view of a sample print made in accordance with the present invention.

FIG. 5 illustrates a color print 130 prepared from a representative sample sheet of color printing paper in accordance with the inventive method. The print 130 comprises four separate test images. The images 132, 134, and 136 are made by a predetermined linearly varying exposure to a different primary color of light, which may be achieved using color separation filters and the optical wedge 120 or any equivalent means, thereby providing a measure of the responsiveness of each of the three emulsion layers. The fourth image 138 is made by a predetermined uniform exposure to one of the primary colors of light for purposes of exposure-time calculation as described below. Because the carriage 114 of the easel 110 slides in a direction perpendicular to the axis of varying optical density of the optical wedge 120, the images 132, 134, and 136 are perfectly aligned so that points in each of the three images that correspond to exposure through a common point of the optical wedge 120 are equidistant from any selected reference line taken perpendicular to the axes of varying optical density of the three images.

Figure 6:
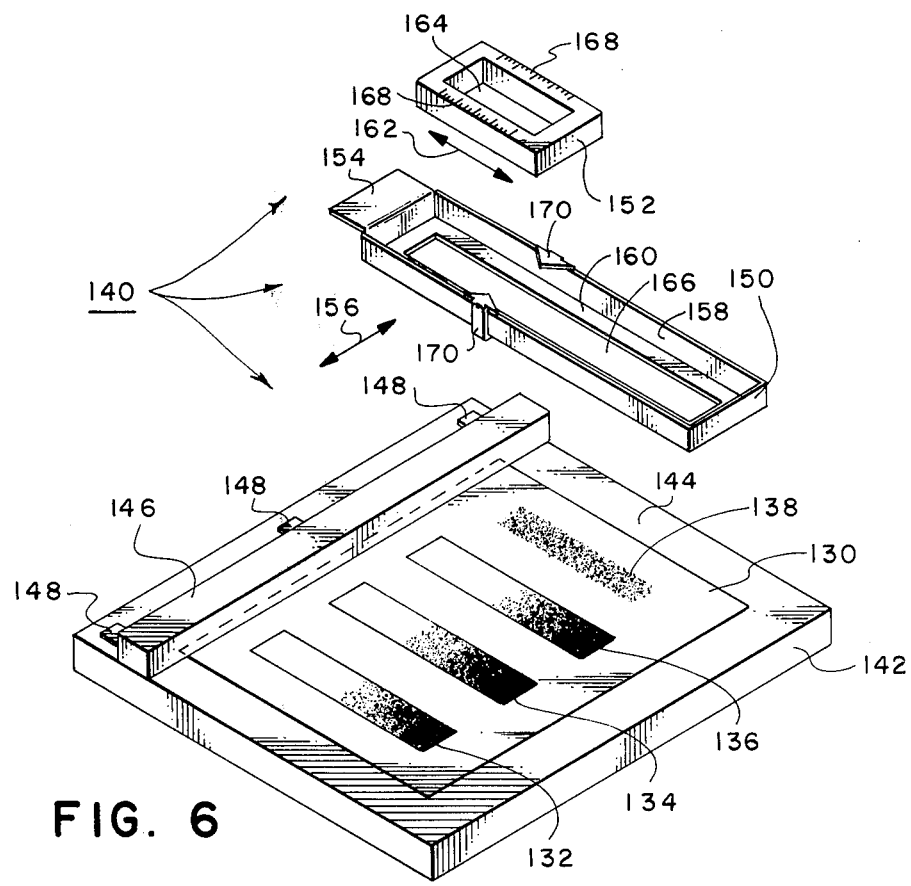
FIG. 6 is a view in perspective of a calculator apparatus made in accordance with the present invention.

FIG. 6 illustrates an apparatus, generally indicated by reference numeral 140, for calculating relative displacement of optical density in the images 132, 134 and 136 of the print 130. A print holder 142 provides a flat surface 144 for mounting the print 130 thereon with the orientation shown. The holder 142 is equipped with a rail 146 having spring-loaded hinges 148 enabling the print 130 to be clamped along one edge. The apparatus 140 further comprises two slide carriages 150 and 152 of rectilinear shapes which may be positioned over the print 130 on the holder 142. A flange 154 facilitates sliding movement of the larger carriage 150 along the rail 146 in the direction shown by arrows 156. The vertical mating surfaces of the rail 146 and the carriage 150 should be made as straight as possible so that the interface between the rail 146 and the print 130 provides a straight reference line for displacement measurements. The larger carriage 150 has sidewalls 158 and a bottom surface 160 permitting sliding movement of the smaller carriage 152 therein in the manner depicted by arrows 162. The smaller carriage 152 has an aperture 164 adapted to provide a snug fit for the probe 52 of the densitometer 50 shown in FIG. 3. The larger carriage 150 has an aperture 166 in the bottom surface 160 permitting light from the densitometer probe 52 to fall on the print 130. Scales 168 with calibrated markings are disposed on the smaller carriage 152, and pointers 170 are slideably disposed on the larger carriage 150, enabling the relative displacement of the two carriages 150 and 152 to be measured from a starting point.

The markings of the scales 168 bear an important relationship to the gradient of the optical wedge 120 of FIG. 4. In order to relate changes in optical density of a printed image of the optical wedge 120 to changes in exposure, the markings are calibrated in units of linear displacement reflecting the density gradient of the optical wedge 120. For example, if the gradient of the optical wedge 120 in use is 0.10 optical density units per centimeter, then the markings may be conveniently placed at one millimeter intervals to give readings of 0.01 optical density units of exposure difference per millimeter of displacement. Those skilled in the art will appreciate that there is a direct relationship between units of differential displacement along the optically variable axis of the wedge 120 and units of log exposure, thereby permitting changes in displacement to be converted to changes in exposure.

In the embodiment shown, the two sets of scales 168 are calibrated in opposite directions. That is, one scale increases in value from right to left while the other scale increases in value from left to right. A single scale with a center zero point would be a satisfactory alternative; however, the double scale arrangement provides twice the range of displacement readings in the same space.

A number of suitable alternative embodiments of the calculator apparatus 140 will suggest themselves to those skilled in the art. For example, the present invention could as well be practiced by using a similar embodiment wherein the scales 168 are disposed on the larger carriage 150, and the pointers 170 are disposed on the smaller carriage 152. In either case, the pointers 170 could alternatively be fixed in place and the scales 168 be made movable. As a further alternative, the larger carriage 150 could be adapted for directly receiving the probe 52 of the densitometer 50, thus eliminating the need for the smaller carriage 152. In such case, the probe 52 could be provided with a pointer or pointers and the carriage 150 could have a moveable scale or scales. Furthermore, a suitably shaped probe 52 could be accommodated to ride along a bar-shaped member in place of the carriage 150. Accordingly, the invention contemplates any system which permits measurement of differential displacements of the probe 52 with respect to points on the paper 130, enabling the direct calculation of color-balance correction factors.

A preferred method of practicing the present invention will now be described by way of an illustrative example. First it is necessary to prepare the enlarger 10 of FIG. 1 to permit the generation of separate exposures in predetermined amounts for each of the three primary colors of light. The enlarger 10 is set up so that the head 12 is sufficiently high to project onto the baseboard 18 a field of illumination having a diameter roughly three times the length of the optical wedge 120. The color analyzer 30 of FIG. 2 is programmed for sensitivity by setting the red, green, and blue attenuators 42, 44, and 46 either to some common setting, or to a reasonable combination of settings that previous practice has shown will be within striking distance of color balance for the printing paper under test. Although the settings are relatively arbitrary, they should not be set so far apart as to exceed the range of possible correction as determined by the gradient of the optical wedge 120 shown in FIG. 4.

With the color analyzer 30 programmed, the probe 32 is placed on the baseboard 18 of the enlarger 10. A red filter of good quality optical gelatin, such as a Kodak Wratten tricolor filter, is placed in the holder 24 beneath the lens 16. Working in the dark so as to confine all meter readings to the measurement only of light being emitted from the enlarger lens 16, the control 36 on the color analyzer probe 32 is switched to the red channel. The aperture (not shown) of the enlarger lens 16 is then varied until the meter 38 reads some arbitrarily selected value, known previously to be suitable, which is defined as the zero point. Next, a suitable green filter replaces the red filter in the holder 24, and the control 36 of the color analyzer 30 is switched to the green channel. Without altering the aperture setting of the lens 16, the intensity of the light emitted from the lamp 14 is varied until the needle 40 falls on the previously selected zero point. Although there are a variety of means for varying the light intensity of the lamp 14, it is presently preferred that the lamp voltage be varied by a device such as the device 26 which is described in U.S. Pat. No. 3,392,626. The device 26, which is serially connected between the lamp 14 and a regulated voltage source (not shown), comprises three channels for selectively operating the lamp 14 at three different voltages. With the lamp intensities of both the red and green exposures set on attenuators 42 and 44, the device 26 is switched to its third channel, an appropriate blue filter is inserted in the holder 24 in place of the green filter, and the control 36 of the color analyzer 30 is switched to its blue channel. The voltage of the lamp 14 is then varied by means of the device 26 to once again bring the needle 40 to the zero point. At this stage, the programmed settings of the color analyzer 30 have been translated into voltage settings on corresponding channels of the device 26, such that subsequent exposures may be made at predetermined light intensities corresponding to the programmed settings of the color analyzer.

If a device, such as the device 26, is not available for varying the light intensity of the lamp 14 in the above described manner, various alternative means can be used to achieve satisfactory results. For example, an automatic colorhead enlarger may be used to selectively vary the intensity of the primary colors of light. Available colorhead enlargers enable continuous color variation using dichroic filters. Another satisfactory, though less advantageous alternative, for varying light intensity is the use of either color printing or color compensating filters in a known manner with a general purpose enlarger. The use of such discrete filters is less desirable because intensity variations can only be made in discontinuous steps. Whatever means for light intensity variation is used, however, it is only necessary that the predetermined value of light intensity be stable and reproducible in the darkroom. An additional factor which must be considered in using optical filtering means to control light intensity, which does not manifest itself when using the voltage control means of the cited patent, is the problem of possible cross-over existing between colors due to the inherent limitations of color filters. Such cross-over effects can be eliminated by repeating the above described procedure for zeroing the color analyzer 30 until it can be switched between primary color channels without moving the needle 40 off the zero point.

In addition to determining color balance, the present invention provides a convenient way for determining the overall responsiveness, or printing speed, of the printing paper being tested, so that an appropriate print density may be achieved. Accordingly, a neutral filter of suitable optical density as determined by prior experience is placed in the holder 24 under the enlarger lens 16. A Kodak Wratten No. 96 neutral density filter having an optical density of 0.70 has been found experimentally to be satisfactory for this purpose. The overall responsiveness of the printing paper is keyed to one of the three emulsion layers, such as for example the red sensitive layer. Accordingly, the previously used red separation filter is placed over the aperture 34 of the color analyzer probe 32 which remains in position on the enlarger baseboard 18. The color analyzer control 36 is switched to its neutral mode. The enlarger light intensity is set at the above established value for red light using the same intensity control means as before. That is, if the voltage control means was used, then the control device 26 should be switched to its red channel. Then the neutral channel attenuator 48 of the color analyzer 30 is adjusted until the meter 38 indicates an exposure time that has been known by prior experience to have produced satisfactory results. The setting of the neutral attenuator 48 is recorded for future reference. The neutral density filter is removed from the holder 24, and the color analyzer probe 32 is removed from the enlarger baseboard 18 as preparations for the next phase of procedural steps begins.

The preferred procedure for making the test print 130 of FIG. 5 will now be described. The easel 110 of FIG. 4 is positioned on the baseboard 18 of the enlarger 10 shown in FIG. 1, so that the optical wedge 120 will lie in the middle of the projected field of illumination from the lense 16. Working now in complete darkness, a sample sheet of color printing paper is secured in place on the carriage 114 using the clips 116. The carriage 114 is then moved to the first of the three stops 128, and the cover 118 is closed to place the optical wedge 120 over a portion of the sample sheet where a first test image will be made. While the flap 124 is open to permit exposure through the optical wedge 120, the flap 126 is closed to cover the aperture 122. The blue separation filter used above in calibrating the intensity for blue light is placed in the holder 24, and the means for controlling the intensity is made operational with respect to the predetermined value for blue light. That is, if the voltage control means was used, the device 26 is switched to its blue channel; whereas, if filtering was used to control light intensity, the appropriate blue-light absorbing filter previously determined is placed in the light path. The blue exposure of the print is then made for the predetermined number of seconds.

The second exposure through the optical wedge 120 proceeds in similar fashion. The carriage 114 is moved to the second of the three stops 128, and the green separation filter replaces the blue separation filter in the holder 24. With the means for controlling the intensity operational with respect to the predetermined value for green light, the green exposure is made for precisely the same time interval as for the previous blue exposure.

The last of three exposures through the optical wedge 120 is achieved similarly using red light. The carriage 114 is moved to the last of the three stops 128, and the red separation filter is inserted in the holder 24 in place of the green separation filter. The means for controlling intensity is made operational with respect to the predetermined value for red light, and then the red exposure is made for precisely the same time as the blue and green exposures.

Finally, a fourth exposure is made for the same duration but without the use of the optical wedge 120. This is facilitated by the construction of the presently preferred easel 110 by simply closing the flap 124 to cover the optical wedge 120 and opening the flap 126 to uncover the aperture 122. The neutral density filter previously used in setting the neutral attenuator 48 of the color analyzer 30 is placed in the enlarger holder 24 in addition to the red separation filter already in place therein. Without adjusting the intensity control means, a final exposure of the printing paper is made for the same time duration as before.

Upon development of the sample sheet of printing paper using the usual laboratory processing techniques, four test images will appear as depicted in FIG. 5. A yellow image 132, a magenta image 134, and a cyan image 136, all of varying optical density, represent respectively the blue, green, and red exposures through the optical wedge 120. A uniform density cyan image 138 represents the red exposure made through the aperture 122.

The procedural steps involved in determining the responsiveness of the light-sensitive emulsion layers in the sample print 130 will now be described with particular reference to FIG. 6. The sample print 130 is positioned on the holder 142 using the rail 146 to clamp one edge of the print 130 against the mounting surface 144 with the parallel axes of images 132, 134, and 136 oriented perpendicular to the facing vertical edge of the rail 146. Slide carriage 150 is positioned over the print 130 and mounting surface 144 with its flange 154 riding on the rail 146. The probe 52 of the reflection densitometer 50 shown in FIG. 3 is fitted into the aperture 164 of the smaller slide carriage 152, which in turn is fitted into the larger carriage 150. The lens 54 of the probe 52 is then positioned over a white, unexposed portion of the processed print 130. The control knob 56 is switched to the red channel. Using the control 60, the readout 58 is adjusted to read zero optical density. The carriage 150 is then moved to align its aperture 166 with the cyan image 136. The assembly of the probe 52 and the smaller carriage 152 is then moved laterally along the larger carriage 150 until the readout 58 indicates a value of optical density that has been found by prior experience to provide a satisfactory overall printing density for the type of color printing paper being used. By way of example, a density value of 0.42 will be used as the balance point in this illustration. When the position has been found that gives the 0.42 density reading on the cyan image 136, the pointers 170 are set opposite the zero points of each of the scales 168. As mentioned above, the scales 168 are calibrated in opposite directions so that, with the pointers 170 zeroed, a movement of the carriage 152 in the direction of increasing density of the image 136 is indicated by a positive displacement on one of the scales 168 with respect to its pointer 170, while the other pointer moves off scale. Similarly, movement of the carriage 152 in the direction of decreasing density of the image 136 produces a reading of negative displacement on the other scale 168 in relation to its pointer 170. Using the alternate embodiment discussed above where a single scale with a center zero point is used, movement of the carriage 152 would produce either positive or negative density readings as the single pointer is displaced from the zero point.

The steps described immediately above fix the pointers 170 in relationship to the carriage 150 such that the overall printing density is keyed to the cyan image 136. The responses of the other two light-sensitive layers are then related to the response of the cyan dye emulsion layer as will now be described. The densitometer probe 52 is again positioned over a white portion of the paper 130, and the control 56 is switched to the green channel. The control 60 is then adjusted for a zero optical density reading. The carriage 150 is then positioned with its aperture 166 over the magenta image 134. The assembly of the probe 52 in the carriage 152 is moved along the magenta image 134 until the readout 58 indicates 0.42 optical density units. This completes the calculation of the green color-balance correction. The correction factor, whether positive or negative, will be indicated by the position of one of the pointers 170 on its corresponding scale 168 making sure that the carriage 150 firmly abuts the rail 146 in the same manner as when the pointers 170 were zeroed with respect to the scales 168. The reading for green color-balance correction is then noted and recorded. A positive green-correction factor indicates a need for increasing the exposure of green light relative to red light, whereas a negative green-correction factor indicates a need for decreasing the exposure of green light relative to red light.

In a similar sequence of steps the blue color-balance correction is then calculated. In particular, the control knob 56 is switched to the blue channel and the probe 52 is positioned over white paper, where once again the knob 60 is adjusted to give a zero optical density reading. The carriage 150 is then moved to position its aperture 166 over the yellow image 132. The assembly of the probe 52 in the carriage 152 is moved to find the balance point of 0.42 optical density units. Again making sure that the carriage 150 firmly abuts the rail 146, a positive or negative displacement reading is given by one of the pointers 170 on its scale 168, which is noted and recorded as the blue color-balance correction factor, positive indicating a need for increased blue exposure and negative indicating a need for decreased blue exposure.

At this point the color balance of the printing paper from which the test sample was selected can be objectively related to other lots of printing paper previously tested using the same procedural test steps. Very useful quantitative information about the relative responsiveness of the light-sensitive emulsion layers may be obtained, particularly if the various tests are always keyed to the same emulsion layer that serves as the reference layer for the color-balance correction factors of the other two layers. The information is most reliable when the same reference layer is anchored to the same balance point density in testing separate lots of printing paper, as for example using the red-light sensitive layer as the reference layer and always anchoring it to 0.42 optical density units in accordance with the above illustration.

It will be appreciated that there is a cooperation between the easel 110 of FIG. 4 and the calculator 140 of FIG. 6. That is, the easel 110 permits the formation of the three images through the optical wedge 120 in a parallel and perfectly aligned fashion so that the displacement measurements can be taken from a perpendicular reference line provided by the edge of the rail 146. A variety of alternate arrangements can be conceived for producing similar results. For example, an easel could be arranged with a carriage that pivots about a point such that the three images of the optical wedge 120 would appear with their axes of varying optical density disposed radially from the pivot point. In such case, a calculator would have to be provided with means for measuring differential displacements of points on the images from the equivalent pivot point or from a reference line formed by an arc having the equivalent pivot point as its center. The present invention contemplates any system for measuring differential displacements of points on the images that can be referenced to a point or points in the optical wedge used to make the images, and for the particular purpose of converting such differential displacement measurements to exposure corrections, such that differing exposures of the primary colors of light can be given to printing paper inverse to the relative sensitivities of the three emulsion layers to produce a print with the three colors of dye in balance.

In addition to objective calculation of color balance, the present invention facilitates objective measurement of the overall printing speed of the paper being tested. Accordingly, the control 56 of the densitometer probe 52 is switched back to the red channel, the lens 54 is placed over a white, unexposed portion of the printing paper, and the readout 58 is zeroed using the control 60. Next, the lens 54 of the probe 52 is positioned over the uniform cyan image 138, and the densitometer reading is noted and recorded for later use. This optical density reading serves to relate the responsiveness of the red-light sensitive layer of the paper under test to the known amount of exposure used to make the uniform cyan image 138. Recalling that the uniform cyan image 138 was made for a predetermined duration using a predetermined light intensity, the intensity being represented by the setting of the neutral channel attenuator 48 of the color analyzer 30, a variety of means can be used to control the overall density of color prints made on paper of like characteristics to the sample sheet of printing paper 130. For example, if it has been determined that the balance point of 0.42 optical density units produces a print of satisfactory overall density, then the differential displacement along the cyan wedge image 136 is found between a point reading 0.42 and a point having the same reading as the uniform cyan image 138. The differential displacement thus measured on the scales 168 provides a printing-speed correction factor, which can be programmed into the color analyzer 30 by adjusting the setting of the neutral channel attenuator 48 for subsequent print making. If the uniform cyan reading is greater than 0.42, then the setting of the attenuator 48 is adjusted downward by an amount equal to the printing-speed correction factor. On the other hand, if the uniform cyan reading is less than 0.42, then the setting of the attenuator 48 is adjusted upward by an amount equal to the printing-speed correction factor.

The remainder of the specification describes a preferred procedure for using the color-balance correction factors to print color negatives. Accordingly, the color analyzer 30 is reprogrammed to take into account the color-balance correction factors computed above. Though it is not necessary, it is preferred that the same separation filters and same lamp intensities used in the initial programming of the color analyzer 30 are also used in the following reprogramming procedure. It will be recalled that the color balance for green and blue was keyed to the red-light sensitive emulsion layer by zeroing the pointers 170 and the scales 168 with the densitometer probe 52 positioned over the balance point on the cyan wedge image 136. Therefore, no adjustment is necessary for the red attenuator 42 of the color analyzer 30. The green adjustment is made by first positioning the probe's aperture 34 in the field of illumination on the enlarger baseboard 18 with the control 36 switched to the green channel. Then, working only in the light of the enlarger 10, the green adjustment is programmed into the color analyzer 30 in the following manner. The green attenuator 44 is adjusted to move the needle 40 on the scale of the meter 38 by an amount corresponding to the amount of optical density units of the green color-balance correction factor. The needle 40 is moved in the direction of increasing optical density if the green color-balance correction factor is positive, whereas the needle 40 is moved in the direction of decreasing optical density if the green color-balance correction factor is negative. In the event that such adjustment causes the needle 40 to move off scale, the initial position of the needle can be reset in a position which will prevent this from occurring preferably by varying the aperture of the lens 16, and then repeating the process of adjusting the setting of the attenuator 44. When the analyzer 30 has been successfully reprogrammed with the green adjustment, the new setting of the green attenuator 44 is noted and recorded.

The procedure for reprogramming the color analyzer 30 for the blue adjustment is identical to the procedure just described for the green adjustment. In particular, the control 36 is switched to the blue channel, and the blue attenuator 46 is adjusted to deflect the needle 40 by either a positive or negative number of optical density units corresponding to the blue color-balance correction factor. The setting thus achieved for the blue attenuator 46 is noted and recorded.

Thus the color balance for paper tested in the above described manner is determined objectively without resort to visual judgment and without tying the color balance to any particular color negative. Such color balance is represented quantitatively by the settings on the color analyzer 30, that is, by the original setting of the red attentuator 42 and the new settings of the green and blue attenuators 44 and 46. These recorded settings for the color balance of the printing paper may now be added to color-balance correction factors for the brand and type of color negative film to be printed. There are a variety of known techniques for obtaining such correction factors for negative film. In a preferred technique, a standard gray test card is photographed, and then its negative is analyzed using a color analyzer such as that shown in FIG. 2. The color analyzer settings for the film and the paper can then be arithmetically combined to produce final printing settings for proper color rendition of the particular combination of negative film and printing paper used. In order to produce color photographic prints of superlative color balance, it is only necessary then to provide a gray card negative for the various different light settings for the photographed subjects.

Those skilled in the art will appreciate that the above-described invention enables the color balance of various lots of color printing paper to be compared objectively by making only one test print from each lot. Once the color balance of a box of printing paper is known, any negative can be printed with a high degree of color excellence, provided only that the color balance of the film has been determined by any acceptable technique.

Those skilled in the art will appreciate that the present invention is applicable to both tricolor additive printing and white-light subtractive printing. Once the color-balance correction factors have been computed, they can be used to adjust the relative exposures of the primary colors of light in a variety of different ways. Since there is a relatively wide middle range of response of the emulsion layers of the printing paper wherein optical density varies linearly with log exposure, the correction factors for the printing paper may be directly converted to changes in values of exposure. Within the limits of reciprocity between time and intensity, exposure variations can be equated to changes in light intensity holding exposure time constant, or changes in exposure time holding light intensity constant. More sophisticated computations can also be used to convert the color-balance correction factors to various combinations of changes in light intensity and exposure duration. Devices for making such conversions are available, such as found in the Kodak Color Dataguide, Kodak Publication R-19.

It is standard procedure in tricolor additive printing to hold the intensity of the enlarger lamp constant while varying the exposure times for each of three exposures of the negative to the printing paper using a different colored separation filter for each exposure. Therefore, tricolor additive printing may be used in conjunction with correction factors calculated in accordance with the present invention by converting the correction factors to changes in the durations of the exposures. For best results, an electronic timer may be used in the circuit powering the enlarger's lamp to precisely control exposure time.

Likewise, white-light subtractive printing may be used in conjunction with correction factors calculated in accordance with the present invention by converting the correction factors to appropriate changes in filter densities of the various subtractive color filters in order to achieve appropriate intensity variations of the three primary colors of light.

Additionally, in a modified tricolor printing process, instead of using exposure time variations, it is possible to use intensity variations by employing the device 26 of FIG. 1 to control the voltage of the enlarger lamp 14 by appropriate amounts for each of the three separate exposures.

Although preferred embodiments have been described in detail, it is to be understood that various changes, substitutions and alterations can be made therein without departing from the spirit and scope of the invention as defined in the appended claims.

What is claimed is:

1. An easel for making exposures of selected portions of a sample sheet of photographic printing paper comprising:
   a single optical wedge of linear density gradient and,
   positioning means for selectively positioning the optical wedge in relation to the printing paper to form a plurality of separate spaced apart images of the optical wedge on the printing paper.

2. The easel of claim 1 wherein the positioning means comprises:
   a frame,
   a carriage slideably disposed in the frame for holding the printing paper, and
   a light-proof cover disposed around the edges of the optical wedge and positionable over the carriage.

3. The easel of claim 2 further comprising means operable by the sense of touch in complete darkness for positioning the carriage at selected points in relation to the optical wedge.

4. The easel of claim 2 further comprising an aperture disposed in the cover spaced from the optical wedge to permit making a uniform exposure of a portion of the printing paper, and means for selectively preventing light passage through the optical wedge or the aperture.

* * * * *